(12) United States Patent
Noguchi et al.

(10) Patent No.: US 8,053,506 B2
(45) Date of Patent: *Nov. 8, 2011

(54) CARBON FIBER COMPOSITE MATERIAL AND METHOD OF PRODUCING THE SAME, FORMED PRODUCT OF CARBON FIBER COMPOSITE AND METHOD OF PRODUCING THE SAME, CARBON FIBER-METAL COMPOSITE MATERIAL AND METHOD OF PRODUCING THE SAME, AND FORMED PRODUCT OF CARBON FIBER-METAL COMPOSITE AND METHOD OF PRODUCING THE SAME

(75) Inventors: Toru Noguchi, Ueda (JP); Akira Magario, Chiisagata-gun (JP)

(73) Assignee: Nissin Kogyo Co., Ltd., Ueda-shi (JP)

( * ) Notice: Subject to any disclaimer, the term of this patent is extended or adjusted under 35 U.S.C. 154(b) by 502 days.

This patent is subject to a terminal disclaimer.

(21) Appl. No.: 10/895,351

(22) Filed: Jul. 21, 2004

(65) Prior Publication Data

US 2005/0075443 A1 Apr. 7, 2005

(30) Foreign Application Priority Data

Jul. 23, 2003 (JP) .................................. 2003-278186
Aug. 18, 2003 (JP) .................................. 2003-294244
Jun. 8, 2004 (JP) .................................. 2004-169668

(51) Int. Cl.
*C08K 3/04* (2006.01)
*C08K 3/08* (2006.01)
*B29C 70/00* (2006.01)

(52) U.S. Cl. ........ 524/439; 524/440; 524/495; 524/496; 164/97; 264/122

(58) Field of Classification Search .................. 524/495, 524/430, 339, 440, 496; 523/307; 164/97; 264/122

See application file for complete search history.

(56) References Cited

U.S. PATENT DOCUMENTS

| 3,828,839 A | * | 8/1974 | Dhingra ........................... 164/97 |
| 4,607,797 A | * | 8/1986 | Enikolopow et al. ........... 241/23 |
| 5,015,289 A | | 5/1991 | Toda et al. |
| 5,445,895 A | | 8/1995 | Behrens et al. |
| 5,458,181 A | | 10/1995 | Corbett et al. |

(Continued)

FOREIGN PATENT DOCUMENTS

CN   1410475 A   4/2003

(Continued)

OTHER PUBLICATIONS

Balabanov et al "Electrical Conductivity and electrostatic properties of radiationally modified polymer composites with carbon black" J. Phys. D. Appl. Phys. 32 (1999) 2573-2577.*

(Continued)

*Primary Examiner* — Vickey Nerangis
(74) *Attorney, Agent, or Firm* — Oliff & Berridge, PLC

(57) ABSTRACT

A method of producing a carbon fiber composite material including: mixing an elastomer which includes an unsaturated bond or a group having affinity to carbon nanofibers with metal particles; and dispersing the carbon nanofibers into the elastomer including the metal particles by a shear force.

22 Claims, 9 Drawing Sheets

U.S. PATENT DOCUMENTS

| | | | |
|---|---|---|---|
| 5,669,434 | A | 9/1997 | Nakao et al. |
| 5,744,235 | A * | 4/1998 | Creehan ............... 428/364 |
| 5,934,355 | A | 8/1999 | Nakao et al. |
| 6,193,915 | B1 * | 2/2001 | Lo et al. ............... 264/44 |
| 6,403,696 | B1 * | 6/2002 | Barber et al. ............ 524/495 |
| 6,506,502 | B2 * | 1/2003 | Lo et al. ............... 428/614 |
| 6,528,572 | B1 * | 3/2003 | Patel et al. ............ 524/495 |
| 6,566,420 | B1 | 5/2003 | Guillot et al. |
| 6,680,016 | B2 | 1/2004 | Wang et al. |
| 6,874,563 | B2 | 4/2005 | Koide et al. |
| 2003/0096104 | A1 | 5/2003 | Tobita et al. |
| 2003/0151030 | A1 * | 8/2003 | Gurin ............... 252/502 |
| 2004/0067153 | A1 * | 4/2004 | Koide et al. ............ 419/8 |
| 2004/0241440 | A1 | 12/2004 | Noguchi et al. |
| 2005/0192396 | A1 | 9/2005 | Noguchi et al. |
| 2005/0194115 | A1 | 9/2005 | Noguchi et al. |
| 2006/0016522 | A1 * | 1/2006 | Noguchi et al. ............ 148/538 |
| 2006/0062986 | A1 | 3/2006 | Magario et al. |
| 2006/0079627 | A1 | 4/2006 | Noguchi et al. |
| 2010/0015032 | A1 | 1/2010 | Magario et al. |

FOREIGN PATENT DOCUMENTS

| | | |
|---|---|---|
| EP | 0 249 927 A2 | 12/1987 |
| EP | 1 016 355 A2 | 7/2000 |
| JP | 01-289843 | 11/1989 |
| JP | 02-212370 | 8/1990 |
| JP | A-2-212370 | 8/1990 |
| JP | 02-276839 | 11/1990 |
| JP | 02-298530 | 12/1990 |
| JP | 02-310329 | 12/1990 |
| JP | 07-102120 | 4/1995 |
| JP | 08-127674 | 5/1996 |
| JP | A-10-88256 | 4/1998 |
| JP | A-10-183269 | 7/1998 |
| JP | A-2002-038033 | 2/2002 |
| JP | 2002-273741 | 9/2002 |
| JP | A-2002-363716 | 12/2002 |
| JP | A-2003-12939 | 1/2003 |
| JP | 2003-113272 | 4/2003 |
| JP | 2003-342480 | 12/2003 |
| JP | 2004-082130 | 3/2004 |
| JP | A-2004-076043 | 3/2004 |
| JP | A-2004-076044 | 3/2004 |
| JP | A-2004-82129 | 3/2004 |
| JP | 2004-210830 | 7/2004 |
| JP | A-2005-23419 | 1/2005 |
| JP | A-2005-68309 | 3/2005 |
| JP | A-2005-68492 | 3/2005 |
| JP | A-2005-171358 | 6/2005 |
| JP | A-2005-179729 | 7/2005 |
| WO | WO 90/10296 | 9/1990 |
| WO | WO 02/076888 A1 | 10/2002 |
| WO | WO 03/060002 A1 | 7/2003 |

OTHER PUBLICATIONS

Dervishi et al. "Electrical and Thermal Properties of Carbon Nanotube Polymer Composite Films" Materials Research Society, Abstract, 1995.*

Noguchi et al., "Structure and Properties for Carbon Nanofiber/Elastomer Nanocomposites," Sep. 10, 2003, 52d SPSJ Symposium on Macromolecules, pp. 1785-1786, (with English-language translation of relevant portions).

Magario et al., "Structure and Properties for Carbon Nanofiber/Alminium Nanocomposites," Oct. 11, 2003, 133d Collected Abstracts of the 2004 Autumn Meeting of The Japan Institute of Metals, pp. 566, (with English-language translation of relevant portions).

T. Noguchi, "Carbon Nanotube/Aluminium Composites with Uniform Dispersion," Feb. 20, 2004, Materials Transactions, No. 2, vol. 45, pp. 602-604, (with English-language translation of relevant portions).

Noguchi et al., "Dynamic Properties for CNT/Al Nanocomposites," Mar. 30, 2004, 134th Collected Abstracts of the 2004 Spring Meeting of The Japan Institute of Metals, pp. 353, (with English-language translation of relevant portions).

Magario et al., "Structure and Thermal Properties for CNT/Al Nanocomposites," Mar. 30, 2004, 134th Collected Abstracts of the 2004 Spring Meeting of the Japan Institute of Metals, pp. 353, (with English-language translation of relevant portions).

Noguchi et al., "Preparation and Properties of Aluminum Nanocomposites by Matrix Substitution of Carbon Nanotube/Elastomer Composites," May 20, 2004, 71st The Society of Rubber Industry, Japan Annual Meeting, p. 30 (with English-language Translation of relevant portions).

Noguchi et al., "Development of Carbon Nanotubes/Aluminum Composites and Expectation as Lightweight Member," Aug. 1, 2004, Engineering Materials, vol. 52, No. 8 (with English-language Translation of relevant portions).

Noguchi et al., "Thermal Expansion of CNT/Al Nanocomposites," Sep. 28, 2004, 135th Collected Abstracts of the 2004 Autumn Meeting of The Japan Institute of Metals, p. 569 (with English-language Translation of relevant portions).

Yang et al., "Mechanical spectroscopy of Mg reinforced with $Al_2O_3$ short fibers and C nanotubes," Materials Science and Engineering, vol. 370, 2004, pp. 512-515.

Office Action cited in U.S. Appl. No. 12/216,575, notification date of Mar. 3, 2011.

* cited by examiner

PARTIALLY ENLARGED VIEW

CARBON FIBER COMPOSITE MATERIAL AND METHOD OF PRODUCING THE SAME, FORMED PRODUCT OF CARBON FIBER COMPOSITE AND METHOD OF PRODUCING THE SAME, CARBON FIBER-METAL COMPOSITE MATERIAL AND METHOD OF PRODUCING THE SAME, AND FORMED PRODUCT OF CARBON FIBER-METAL COMPOSITE AND METHOD OF PRODUCING THE SAME

Japanese Patent Application No. 2003-278186, filed on Jul. 23, 2003, Japanese Patent Application No. 2003-294244, filed on Aug. 18, 2003, and Japanese Patent Application No. 2004-169668, filed on Jun. 8, 2004, are hereby incorporated by reference in their entirety.

BACKGROUND OF THE INVENTION

The present invention relates to a carbon fiber composite material and a method of producing the same, a formed product of carbon fiber composite and a method of producing the same, a carbon fiber-metal composite material and a method of producing the same, and a formed product of carbon fiber-metal composite and a method of producing the same.

In recent years, composite materials using carbon nanofibers have attracted attention. These composite materials are expected to exhibit improved mechanical strength and the like due to the presence of the carbon nanofibers.

As a casting method for a metal composite material, a casting method in which a molten metal permeates a porous formed product consisting of oxide ceramics by causing magnesium vapor to permeate and become dispersed in the porous formed product and by introducing nitrogen gas has been proposed (see Japanese Patent Application Laid-open No. 10-183269, for example).

However, since the carbon nanofibers have strong aggregating properties, it is very difficult to uniformly disperse the carbon nanofibers in a substrate of a composite material. Therefore, it is difficult to obtain a carbon nanofiber composite material having desired properties, and the expensive carbon nanofibers cannot be efficiently utilized.

Moreover, since the conventional casting method in which a molten metal is caused to permeate the porous formed product consisting of oxide ceramics includes complicated processing, production on an industrial scale is difficult.

BRIEF SUMMARY OF THE INVENTION

The present invention may provide a carbon fiber composite material in which carbon nanofibers are uniformly dispersed, and a method of producing the same. The present invention may also provide a formed product of carbon fiber composite in which carbon nanofibers are uniformly dispersed, and a method of producing the same. The present invention may further provide a carbon fiber-metal composite material in which carbon nanofibers a uniformly dispersed, and a method of producing the same. The present invention may further provide a formed product of carbon fiber-metal composite in which carbon nanofibers arc uniformly dispersed, and a method of producing the same.

According to one aspect of the present invention, there is provided a carbon fiber composite material comprising: an elastomer; and metal particles and carbon nanofibers dispersed in the elastomer, wherein the elastomer includes an unsaturated bond or a group having affinity to the carbon nanofibers.

In the carbon fiber composite material of the present invention, the carbon nanofibers are further uniformly dispersed in the elastomer as a substrate for reasons described later. In particular, it is difficult to disperse ca nanofibers with a diameter of about 30 nm or less or carbon nanofibers in the shape of a curved fiber. However, these carbon nanofibers ca be uniformly dispersed in the elastomer.

The elastomer used in the present invention may be either a rubber elastomer or a thermoplastic elastomer. In the case of using the rubber elastomer, the elastomer may be either a crosslinked form or an uncrosslinked form. As the raw material elastomer, an uncrosslinked form is used in the case of using the rubber elastomer. The carbon nanofibers are dispersed to only a small extent in ethylene propylene rubber (EPDM) among thermoplastic elastomers. However, according to the present invention, the carbon nanofibers can be uniformly dispersed in EPDM due to the carbon nanofiber dispersion effect of the metal particles.

In a formed product of carbon fiber composite obtained by crosslinking the carbon fiber composite material according to the present invention and a formed product of carbon fiber composite obtained from the carbon fiber composite material without crosslinking the carbon fiber composite material, the carbon nanofibers are uniformly dispersed due to the presence of the metal particles in the same manner as in the carbon fiber composite material.

In a carbon fiber-metal composite material obtained by powder-forming the carbon fiber composite material or the formed product of carbon fiber composite according to the present invention, the carbon nanofibers are uniformly dispersed due to the presence of the metal particles in the same manner as in the carbon fiber composite material.

In a carbon fiber-metal composite material obtained by mixing the carbon fiber composite material or the formed product of carbon fiber composite according to the present invention into a molten metal and casting the mixture, the carbon nanofibers are uniformly dispersed due to the presence of the metal particles in the same manner as in the carbon fiber composite material.

In a formed product of carbon fiber-metal composite obtained by permeating a molten metal into the formed product of carbon fiber composite according to the present invention to replace the elastomer with the metal, the carbon nanofibers are uniformly dispersed due to the presence of the metal particles in the same manner as in the carbon fiber composite material. In particular, if a formed product of carbon fiber composite comes in contact with a molten metal, the molten metal permeates the formed product of carbon fiber composite while thermally decomposing the elastomer, and the elastomer is replaced by solidified metal, so that a formed product of carbon fiber-metal composite in which carbon nanofibers are uniformly dispersed can be cast. In the formed product of carbon fiber composite, the amount of the metal particles is 10 to 3,000 parts by weight, and preferably 100 to 1000 parts by weight for 100 parts by weight of the elastomer. If the amount of the metal particles is less than 10 parts by weight, the permeation rate of the molten metal is decreased due to a small degree of capillary phenomenon, thereby giving rise to problems from the viewpoint of productivity and cost. If the amount of the metal particles exceeds 3,000 parts by weight, permeation into the elastomer becomes difficult when producing the carbon fiber composite material.

According to another aspect of the present invention, there is provided a method of producing a carbon fiber composite material, comprising:

mixing an elastomer which includes an unsaturated bond or a group having affinity to carbon nanofibers with metal particles; and mixing the carbon nanofibers into the elastomer including the metal particles and dispersing the carbon nanofibers by a shear force.

According to this method, since the unsaturated bond or group of the elastomer bonds to an active portion of the carbon nanofiber, in particular, a terminal radical of the carbon nanofiber, the aggregation force of the carbon nanofibers can be reduced, whereby dispersibility can be increased. Turbulent flows of the elastomer occur around the metal particles when dispersing the carbon nanofibers by a shear force by using the elastomer including the metal particles. As a result, the carbon fiber composite material of the present invention has a structure in which the carbon nanofibers are further uniformly dispersed in the elastomer as a substrate. In particular, even carbon nanofibers with a diameter of about 30 nm or less or carbon nanofibers in the shape of a curved fiber can be uniformly dispersed in the elastomer.

The step of dispersing the carbon nanofibers in the elastomer by a shear force may be carried out by using (a) an open-roll method with a roll distance of 0.5 mm or less, (b) a closed kneading method, (c) a multi-screw extrusion kneading method, or the like.

A method of producing a formed product of carbon fiber composite having a step of crosslinking the carbon fiber composite material according to the present invention can produce a formed product of carbon fiber composite in which the carbon nanofibers are uniformly dispersed due to the presence of the metal particles by crosslinking the carbon fiber composite material in which the carbon nanofibers are uniformly dispersed. A formed product of carbon fiber composite having a desired shape in which the carbon nanofibers are uniformly dispersed can be obtained by performing the crosslinking step while forming the carbon fiber composite material in a die having a desired shape. A method of producing a formed product of carbon fiber composite having a step of forming the carbon fiber composite material according to the present invention into a desired shape without crosslinking the carbon fiber composite material can produce a formed product of carbon fiber composite in which the carbon nanofibers are uniformly dispersed.

A method of producing a carbon fiber-metal composite material having a step of mixing the carbon fiber composite material or the formed product of carbon fiber composite according to the present invention into a molten metal and casting the mixture in a die having a desired shape can produce a carbon fiber-metal composite material in which the carbon nanofibers are uniformly dispersed due to the presence of the metal particles by casting the formed product of carbon fiber composite in which the carbon nanofibers are uniformly dispersed as described above.

A method of producing a formed product of carbon fiber-metal composite including: disposing a metal ingot above the formed product of carbon fiber composite according to the present invention; heating the metal ingot to melt into a molten metal and heating the formed product of the carbon fiber composite to vaporize the elastomer in the formed product of carbon fiber composite; and replacing the elastomer with the molten metal, can produce a formed product of carbon fiber-metal composite in which the elastomer in the formed product of carbon fiber composite in which the carbon nanofibers are uniformly dispersed is replaced with the metal. In particular, in the formed product of carbon fiber composite, the amount of the metal particles is 10 to 3,000 parts by weight, and preferably 100 to 1000 parts by weight for 100 parts by weight of the elastomer. If the amount of the metal particles is less than 10 parts by weight, the permeation rate of the molten metal is decreased due to a small degree of capillary phenomenon, thereby giving rise to problems from the viewpoint of productivity and cost. If the amount of the metal particles exceeds 3,000 parts by weight, impregnation with the elastomer becomes difficult when producing the carbon fiber composite material. It is preferable that the formed product of carbon fiber composite is formed in an uncrosslinked state, because the elastomer is easily decomposed, whereby the molten metal can swiftly permeate the formed product of carbon fiber composite.

A method of producing a carbon fiber-metal composite material including a step of powder-forming the carbon fiber composite material or the formed product of carbon fiber composite according to the present invention can produce a carbon fiber-metal composite material in which the carbon nanofibers are uniformly dispersed by using the carbon fiber composite material or the formed product of carbon fiber composite in which the carbon nanofibers are uniformly dispersed as described above.

DETAILED DESCRIPTION OF THE EMBODIMENTS

Figure 1:
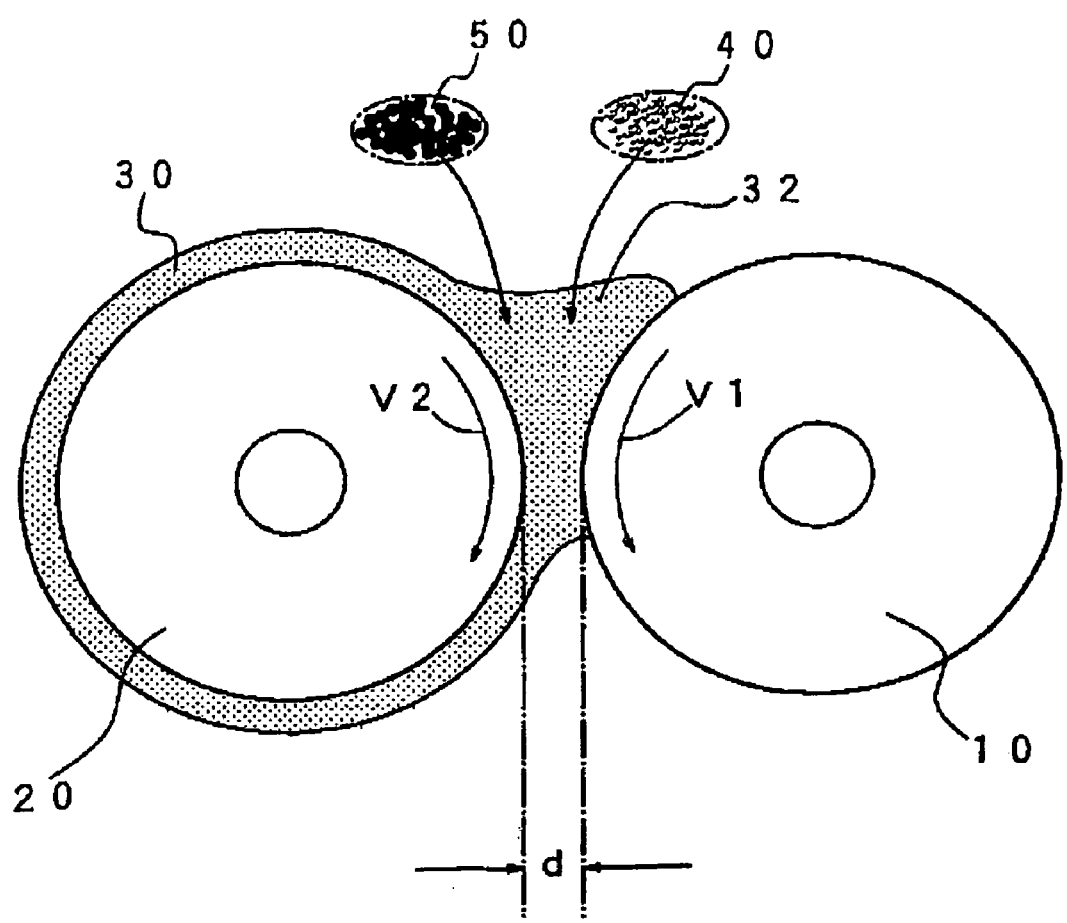
FIG. 1 is a diagram schematically showing a kneading method for an elastomer and carbon nanofibers using an open-roll method, according to one embodiment of the present invention.

Embodiments of the present invention will be described in detail below with reference to the drawings.

According to one embodiment of the present invention, there is provided a carbon fiber composite material comprising: an elastomer; and metal particles and carbon nanofibers dispersed in the elastomer.

A formed product of carbon fiber composite according to one embodiment of the present invention can be obtained by forming the carbon fiber composite material into a desired shape with or without crosslinking the carbon fiber composite material.

A carbon fiber-metal composite material according to one embodiment of the present invention can be obtained by powder-forming the carbon fiber composite material or the formed product of carbon fiber composite.

A carbon fiber-metal composite material according to one embodiment of the present invention can be obtained by mixing the carbon fiber composite material or the formed product of carbon fiber composite into a molten metal and casting the mixture.

A formed product of carbon fiber-metal composite according to one embodiment of the present invention can be obtained by permeating a molten metal into the formed product of carbon fiber composite to replace the elastomer with the metal.

According to one embodiment of the present invention, there is provided a method of producing a carbon fiber composite material, comprising: mixing an elastomer which includes an unsaturated bond or a group having affinity to carbon nanofibers with metal particles; and mixing the carbon nanofibers into the elastomer including the metal particles and dispersing the carbon nanofibers by a shear force.

According to one embodiment of the present invention, there is provided a method of producing a formed product of carbon fiber composite, comprising: forming the carbon fiber composite material into a desired shape. According to one embodiment of the present invention, there is provided a method of producing a formed product of carbon fiber composite, comprising: crosslinking and forming the carbon fiber composite material.

A method of producing a carbon fiber-metal composite material according to one embodiment of the present invention includes a step of casting the carbon fiber composite material or the formed product of carbon fiber composite and a molten metal in a die.

According to one embodiment of the present invention, there is provided a method of producing a formed product of carbon fiber-metal composite comprising: disposing a metal ingot above the formed product of carbon fiber composite; heating the metal ingot to melt into a molten metal and heating the formed product of the carbon fiber composite to vaporize the elastomer in the formed product of carbon fiber composite; and replacing the elastomer with the molten metal.

A method of producing a carbon fiber-metal composite material according to one embodiment of the present invention includes a step of powder-forming the carbon fiber composite material or the formed product of carbon fiber composite.

The elastomer preferably has characteristics such as a certain degree of molecular length and flexibility in addition to high affinity to the carbon nanofibers. In the step of dispersing the carbon nanofibers in the elastomer by a shear force, it is preferable that the carbon nanofibers and the elastomer be kneaded at a shear force as high as possible.

1. Elastomer

The elastomer has a molecular weight of preferably 5,000 to 5,000,000, and still more preferably 20,000 to 3,000,000. If the molecular weight of the elastomer is within this range, since the elastomer molecules are entangled and linked, the elastomer easily enters the space between aggregated carbon nanofibers. Therefore, the effect of separating the carbon nanofibers is increased. If the molecular weight of the elastomer is less than 5,000, since the elastomer molecules cannot be sufficiently entangled, the effect of dispersing the carbon nanofibers is reduced even if a shear force is applied in the subsequent step. If the molecular weight of the elastomer is greater than 5,000,000, the elastomer becomes too hard, thereby making processing difficult.

The network component of the elastomer in an uncrosslinked form has a spin-spin relaxation time $T2n/30°$ C.) measured at 30° C. by a Hahn-echo method using pulsed nuclear magnetic resonance (NMR) technique of preferably 100 to 3,000 μsec, and still more preferably 200 to 1,000 μsec. If the elastomer has the spin-spin relaxation time $T2n/30°$ C.) within the above range, the elastomer is flexible and has sufficiently high molecular mobility. Therefore, when the elastomer and the carbon nanofibers are mixed, the elastomer can easily enter the space between the carbon nanofibers due to high molecular mobility. If the spin-spin relaxation time $T2n/30°$ C.) is shorter than 100 μsec, the elastomer cannot have sufficient molecular mobility. If the spin-spin relaxation time $T2n/30°$ C.) is longer than 3,000 μsec, the elastomer tends to flow as a liquid, whereby it becomes difficult to disperse the carbon nanofibers.

The network component of the elastomer in a crosslinked form preferably has a spin-spin relaxation time (T2n) measured at 30° C. by the Hahn-echo method using the is pulsed NMR technique of 100 to 2,000 μsec. The reasons therefor are the same as those for the uncrosslinked form. Specifically, when an uncrosslinked form which satisfies the above conditions is crosslinked according to the method of the present invention, the spin-spin relaxation time (T2n) of the resulting crosslinked form almost falls within the above range.

The spin-spin relaxation time obtained by the Hahn-echo method using the pulsed NMR technique is a measure which represents molecular mobility of a substance. In more detail, when the spin-spin relaxation time of the elastomer is measured by the Hahn-echo method using the pulsed NMR technique, a first component having a first spin-spin relaxation time (T2n) which is shorter and a second component having a second spin-spin relaxation time (T2nn) which is longer are detected. The first component corresponds to the network component (backbone molecule) of the polymer, and the second component corresponds to the non-network component (branched component such as a terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method in the pulsed NMR technique, a solid-echo method, a Carr-Purcell-Meiboom-Gill (CPMG) method, or a 90° pulse method may be applied in addition to the Hahn-echo method. However, since the carbon fiber composite material according to one embodiment of the present invention has a medium spin-spin relaxation time (T2), the Hahn-echo method is most suitable. Generally, the solid-echo method and the 90° pulse method are suitable for the measurement of a short spin-spin relaxation time (T2), the Hahn-echo method is suitable for the measurement of a medium spin-spin relaxation time (T2), and the CPMG method is suitable for the measurement of a long spin-spin relaxation time (T2).

The elastomer includes an unsaturated bond or a group having affinity to the carbon nanofiber, in particular, to a terminal radical of the carbon nanofiber in at least one of the main chain, side chain, and terminal chain, or has properties of readily forming such a radical or group. The unsaturated bond or group may be at least one selected from a double bond, a triple bond, and functional groups such as α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

A carbon nanofiber generally consists of six-membered rings of carbon atoms on the side surface, and five-membered rings are introduced at the end to form a closed structure. However, since the carbon nanofiber has a forced structure, a defect tends to occur and a radical or a functional group tends to be formed at the defect. In one embodiment of the present invention, since the elastomer includes an unsaturated bond or a group having high affinity (reactivity or polarity) to the radical of the carbon nanofiber in at least one of the main chain, side chain, and terminal chain of the elastomer, the elastomer and the carbon nanofiber can be bonded. This enables the carbon nanofibers to be easily dispersed by overcoming the aggregation force of the carbon nanofibers.

As the elastomer, elastomers such as natural rubber (NR), epoxidized natural rubber (ENR), styrene butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), and polysulfide rubber (T); thermoplastic elastomers such as olefin-based elastomers (TPO), poly(vinyl chloride)-based elastomers (TPVC), polyester-based elastomers (TPEE), polyurethane-based elastomers (TPU), polyamide-based elastomers (TPEA), and polystyrene-based elastomers (SBS); and mixtures of these elastomers may be used. The present inventors have confirmed that it is difficult to disperse the carbon nanofibers in ethylene propylene rubber (EPR or EPDM).

2. Metal Particles

The metal particles are mixed and dispersed in the elastomer in advance, and allow the carbon nanofibers to be further uniformly dispersed when mixing the carbon nanofibers. As the metal particles, particles of aluminum and an aluminium alloy, magnesium and a magnesium alloy, iron and an iron alloy, and the like may be used either individually or in combination of two or more. The metal particles preferably have an average particle size greater than the average diameter of the carbon nanofibers to be used. The average particle size of the metal particles is 500 µm or less, and preferably 1 to 300 µm. In the case of using a pressureless permeation method in a casting step, the amount of the metal particles is 10 to 3,000 parts by weight, and preferably 100 to 1,000 parts by weight for 100 parts by weight of the elastomer. If the amount of the metal particles is less than 10 parts by weight, the permeation rate of a molten metal is decreased due to a small degree of capillary phenomenon, thereby giving rise to problems from the viewpoint of productivity and cost. If the amount of the metal particles exceeds 3,000 parts by weight, impregnation with the elastomer becomes difficult when producing a carbon fiber composite material. The shape of the metal particles is not limited to spherical. The metal particles may be in the shape of a sheet or a scale insofar as turbulent flows occur around the metal particles during mixing.

In the case where the metal particles are aluminum particles, an oxide on the surfaces of the aluminum particles is reduced by a radical generated by thermal decomposition of the elastomer when causing the aluminum molten metal to permeate. This improves wettability between the aluminum particles and the aluminum molten metal, whereby the bonding se can be increased. Moreover, flows accompanying permeation of the aluminum molten metal cause the carbon nanofibers to enter the aluminum particles. The above-described preferable effects are obtained in the case where the metal particles are particles having an oxide on the surface, such as aluminum particles.

3. Carbon Nanofiber

The carbon nanofibers preferably have an average diameter of 0.5 to 500 nm. In order to increase the strength of the carbon fiber composite material, the average diameter of the carbon nanofibers is still more preferably 0.5 to 30 µm. The carbon nanofibers may be in the shape of a linear fiber or a curved fiber.

The amount of the carbon nanofibers to be added is not particularly limited and may be determined depending on the application. In the carbon fiber composite material according to one embodiment of the present invention, a crosslinked elastomer, an uncrosslinked elastomer, or a thermoplastic polymer may be directly used as the elastomer material. The carbon fiber composite material may be used as a raw material for a metal composite material. In the case where the carbon fiber composite material is used as a raw material for a metal composite material, the carbon fiber composite material may include the carbon nanofibers in an amount of 0.01 to 50 wt %. Such a raw material for a metal composite material may be used as a masterbatch as a carbon nanofiber source when mixing the carbon nanofibers into a metal.

As examples of the carbon nanofibers, a carbon nanotube and the like can be given. The carbon nanotube has a single-layer structure in which a graphene sheet of a hexagonal carbon layer is closed in the shape of a cylinder, or a multi-layer structure in which the cylindrical structures are nested. Specifically, the carbon nanotube may consist of only the single-layer structure or only the multi-layer structure, or the single-layer structure and the multi-layer structure may be present in combination A carbon material partially having the structure of the carbon nanotube may also be used. The carbon nanotube is also called a graphite fibril nanotube.

The single-layer carbon nanotube or the multi-layer carbon nanotube is produced to a desired size by an arc discharge method, a laser ablation method, a vapor-phase growth method, or the like.

The arc discharge method is a method in which an arc is discharged between electrode materials made of a carbon rod in an argon or hydrogen atmosphere at a pressure lower than atmospheric pressure to some extent to obtain a multi-layer carbon nanotube deposited on the cathode. The single-layer carbon nanotube is obtained from soot adhering to the inner side surface of a processing vessel by mixing a catalyst such as nickel/cobalt into the carbon rod and discharging an arc.

The laser ablation method is a method in which a target carbon surface into which a catalyst such as nickel/cobalt is mixed is irradiated with a strong pulse laser light from a YAG laser in noble gas (argon, for example) to melt and evaporate the carbon surface, thereby obtaining a single-layer carbon nanotube.

The vapor-phase growth method is a method in which a carbon nanotube is synthesized by thermally decomposing hydrocarbons such as benzene or toluene in a vapor phase. A floating catalyst method, a zeolite-supported catalyst method, and the like can be given as specific examples.

The carbon nanofibers may be provided with improved adhesion and wettability with the elastomer by subjecting the carbon nanofibers to a surface treatment such as an ion-injection treatment, sputter-etching treatment, or plasma treatment before kneading the carbon nanofibers and the elastomer.

4. Mixing the Carbon Nanofibers into the Elastomer and Dispersing the Carbon Nanofibers by a Shear Force An example using an open-roll method with a roll distance of 0.5 mm or less is described as the step of mixing the metal particles and the carbon nanofibers into the elastomer.

FIG. 1 is a view schematically showing the open-roll method using two rolls. In FIG. 1, a reference numeral 10 denotes a first roll, and a reference numeral 20 denotes a second roll. The first roll 10 and the second roll 20 are disposed at a predetermined distance d of preferably 1.0 mm or less, and still more preferably 0.1 to 0.5 mm. The first and second rolls are rotated normally or reversely. In the example shown in FIG. 1, the first roll 10 and the second roll 20 are rotated in the directions indicated by the arrows. The surface velocity of the first roll 10 is denoted by V1, and the surface velocity of the second roll 20 is denoted by V2. The surface velocity ratio (V1/V2) of the first roll 10 to the second roll 20 is preferably 1.05 to 3.00, and still more preferably 1.05 to 1.2. A desired shear force can be obtained by using such a surface velocity ratio. When an elastomer 30 is wound around the second roll 20 in a state in which the first and second rolls are rotated, a bank 32 in which the elastomer is deposited between the rolls 10 and 20 is formed. The step of mixing the elastomer 30 and metal particles 50 is performed by adding the metal particles 50 to the bank 32 and rotating the first and second rolls 10 and 20. Carbon nanofibers 40 are added to the bank 32 in which the elastomer 30 and the metal particles 50 are mixed, and the first and second rolls 10 and 20 are rotated. The distance between the first and second rolls 10 and 20 is reduced to the distance d, and the first and second rolls 10 and 20 are rotated at a predetermined surface velocity ratio. This causes a high shear force to be applied to the elastomer 30, and the aggregated carbon nanofibers are separated by the shear force so that the carbon nanofibers are pulled out one by one, and dispersed in the elastomer 30. The shear force due to the rolls causes turbulent flows to occur around the metal particles dispersed in the elastomer. These complicated flows cause the carbon nanofibers to be further dispersed in the elastomer 30. If the elastomer 30 and the carbon nanofibers 40 are mixed before mixing the metal particles 50, since the movement of the elastomer 30 is restricted by the carbon nanofibers 40, it becomes difficult to mix the metal particles 50. Therefore, it is preferable to perform the step of mixing the metal particles 50 before adding the carbon nanofibers 40 to the elastomer 30.

In this step, the elastomer and the carbon nanofibers are mixed at a comparatively low temperature of preferably 0 to 50° C., and still more preferably 5 to 30° C. in order to obtain a shear force as high as possible. In the case of using the open-roll method, it is preferable to set the roll temperature at the above temperature. The distance d between the first and second rolls 10 and 20 is set to be greater than the average particle size of the metal particles 50 even in the smallest state. This enables the carbon nanofibers 40 to be uniformly dispersed in the elastomer 30.

Since the elastomer in this embodiment has the above-described characteristics, specifically, the above-described molecular configuration (molecular length), molecular motion, and chemical interaction with the carbon nanofibers, dispersion of the carbon nanofibers is facilitated. Therefore, a carbon fiber composite material and a formed product of carbon fiber composite excelling in dispersibility and dispersion stability (reaggregation of carbon nanofibers rarely occurs) can be obtained. In more detail, when the elastomer and the carbon nanofibers are mixed, the elastomer having an appropriately long molecular length and high molecular mobility enters the space between the carbon nanofibers, and a specific portion of the elastomer bonds to a highly active portion of the carbon nanofiber through chemical interaction.

When a high shear force is applied to the mixture of the elastomer and the carbon nanofibers in this state, the carbon nanofibers move accompanying the movement of the elastomer, whereby the aggregated carbon nanofibers are separated and dispersed in the elastomer. The carbon nanofibers which have been dispersed are prevented from reaggregating due to chemical interaction with the elastomer, whereby excellent dispersion stability can be obtained.

Since a predetermined amount of the metal particles are included in the elastomer, a shear force also functions in the direction in which the carbon nanofibers are separated due to a number of complicated flows such as turbulent flows of the elastomer around the metal particles. Therefore, since even carbon nanofibers with a diameter of about 30 nm or less or carbon nanofibers in the shape of a curved fiber move in the flow directions of the elastomer molecules to which the carbon nanofibers have bonded due to chemical interaction, the carbon nanofibers are uniformly dispersed in the elastomer.

The step of dispersing the carbon nanofibers in the elastomer by a shear force may be performed by using a closed kneading method or a multi-screw extrusion kneading method in addition to the open-roll method. In other words, it suffices that this step apply shear force sufficient to separate the aggregated carbon nanofibers to the elastomer.

A carbon fiber composite material obtained by the step in which the metal particles and the carbon nanofibers are mixed and dispersed in the elastomer (mixing and dispersion step) may be crosslinked using a crosslinking agent and formed, or formed without crosslinking the carbon fiber composite material. A formed product of carbon fiber composite may be obtained by performing a compression forming step or an extrusion forming step, for example. The compression forming step includes a step of forming the carbon fiber composite material in which the metal particles and the carbon nanofibers are dispersed in a pressurized state for a predetermined period of time (20 min, for example) in a forming die having a desired shape and set at a predetermined temperature (175° C., for example).

In the mixing and dispersing step of the elastomer and the carbon nanofibers or in the subsequent step, additives usually used for processing of elastomers such as rubber may be added. As the additives, conventional additives may be used. Examples of additives include a crosslinking agent, a vulcanizing agent, a vulcanization accelerator, a vulcanization retarder a softener, a plasticizer, a curing agent, a reinforcing agent, a filler, an aging preventive, a colorant, and the like.

5. Carbon Fiber Composite Material and Formed Product of Carbon Fiber Composite

In the carbon fiber composite material and the formed product of carbon fiber composite according to one embodiment of the present invention, the carbon nanofibers are uniformly dispersed in the elastomer as a substrate. In other words, the elastomer is restrained by the carbon nanofibers. The mobility of the elastomer molecules restrained by the carbon nanofibers is smaller than that in the case where the elastomer molecules are not restrained by the carbon nanofibers. Therefore, the first spin-spin relaxation time (T2n), the second spin-spin relaxation time (T2nn), and the spin-lattice relaxation time (T1) of the carbon fiber composite material and the formed product of carbon fiber composite are shorter than those of the elastomer which does not include the carbon nanofibers. In particular, in the case of mixing the carbon nanofibers into the elastomer including the metal particles, the second spin-spin relaxation time (T2nn) becomes shorter than that of the elastomer including the carbon nanofibers. The spin-lattice relaxation time (T1) of the crosslinked form (formed product of carbon fiber composite) varies in proportion to the amount of the carbon nanofibers mixed.

The number of non-network components (non-reticulate chain components) is considered to be reduced in a state in which the elastomer molecules are restrained by the carbon nanofibers for the following reasons. Specifically, when the molecular mobility of the elastomer is entirely lowered by the carbon nanofibers, since the number of non-network components which cannot easily move is increased, the non-network components tend to behave in the same manner as the network components. Moreover, since the non-network components (terminal chains) easily move, the non-network components are easily adsorbed to the active point of the carbon nanofibers. As a result, the number of non-network components is decreased. Therefore, the friction (fnn) of components having the second spin-spin relaxation time becomes smaller than that of the elastomer which does not include the carbon nanofibers. In particular, in the case of mixing the carbon nanofibers into the elastomer including the metal particles, the fraction (fnn) of components having the second spin-spin relaxation time becomes further smaller than that of the elastomer including the carbon nanofibers.

Therefore, the carbon fiber composite material and the formed product of carbon fiber composite according to this embodiment preferably have values measured by the Hahn-echo method using the pulsed NMR technique within the following range.

Specifically, in the uncrosslinked form (carbon fiber composite material), it is preferable that the first spin-spin relaxation time (T2n) measured at 150° C. be 100 to 3,000 μsec, the second spin-spin relaxation time (T2nn) measured at 150° C. be absent or 1,000 to 10,000 μsec, and the fraction (fnn) of components having the second spin-spin relaxation time be less than 0.2.

In the crosslinked form (formed product of carbon fiber composite), it is preferable that the first spin-spin relaxation time (T2n) measured at 150° C. be 100 to 2,000 μsec, the second spin-spin relaxation time (T2nn) measured at 150° C. be absent or 1,000 to 4000 μsec, and the traction (fnn) of components having the second spin-spin relaxation time be less than 0.08.

The carbon fiber composite material and the formed product of carbon fiber composite according preferably have values measured by the Hahn-echo method using the pulsed NMR technique within the following range. Specifically, the amount of change (ΔT1) in the spin-lattice relaxation time (T1) measured at 150° C. of the crosslinked form (formed product of carbon fiber composite) per vol % of the carbon nanofibers is preferably 1 msec or more, and still more preferably 2 to 15 msec smaller than that of the elastomer.

The spin-lattice relaxation time (T1) measured by the Hahn-echo method using the pulsed NMR technique is a measure which represents molecular mobility of a substance in the same manner as the spin-spin relaxation time (T2). In more detail, the shorter the spin-lattice relaxation time of the elastomer, the lower the molecular mobility and the harder the elastomer. The longer the spin-lattice relaxation time of the elastomer, the higher the molecular mobility and the softer the elastomer.

The carbon fiber composite material and the formed product of carbon fiber composite preferably have a flow temperature, determined by temperature dependence measurement of dynamic viscoelasticity, 20° C. or more higher than the flow temperature of the raw material elastomer. In the carbon fiber composite material and the formed product of carbon fiber composite, the metal particles and the carbon nanofibers are uniformly dispersed in the elastomer. In other words, the elastomer is restrained by the carbon nanofibers as described above. The elastomer in this state exhibits molecular motion smaller than that of the elastomer which does not include the carbon nanofibers. As a result, flowability is decreased. The carbon fiber composite material and the formed product of carbon fiber composite having such flow temperature characteristics exhibit small temperature dependence of dynamic viscoelasticity. As a result, the carbon fiber composite material and the formed product of carbon fiber composite have excellent thermal resistance.

As described above, the carbon fiber composite material and the formed product of carbon fiber composite in this embodiment can be used as an elastomer material, or as a raw material for a metal composite material or the like. The carbon nanofibers are generally entangled and dispersed in a medium to only a small extent. However, if the carbon fiber composite material or the formed product of carbon fiber composite in this embodiment is used as a raw material for a metal composite material, since the carbon nanofibers are present in the elastomer in a dispersed state, the carbon nanofibers can be easily dispersed in a medium by mixing the raw material and the medium such as a metal.

6. Casting of a Carbon Fiber-metal Composite Material and Formed Product of Carbon Fiber-metal Composite The casting step of the carbon fiber-metal composite material may be performed by a step of mixing the carbon fiber composite material or the formed product of carbon fiber composite obtained in the above embodiments into a molten metal, and casting the mixture in a die having a desired shape, for example. In the casting step, a metal mold casting method, a diecasting method, or a low-pressure diecasting method, in which a molten metal is poured into a die made of steel, may be employed. A method classified into a special casting method, such as a high-pressure casting method in which a molten metal is caused to solidify at a high pressure, a thixocasting method in which a molten metal is stirred, or a centrifugal casting method in which a molten metal is cast in a die by utilizing centrifugal force may also be employed. In the above casting method, a molten metal is caused to solidify in a die in a state in which the carbon fiber composite material or the formed product of carbon fiber composite is mixed into the molten metal to form a carbon fiber-metal composite material or a formed product of carbon fiber-metal composite. In this casting step, the elastomer in the carbon fiber composite material or the formed product of carbon fiber composite is decomposed and removed by the heat of the molten metal.

The molten metal used in the casting step may be appropriately selected from metals used in a conventional casting process, such as iron and an iron alloy, aluminum and an aluminum alloy, magnesium and a magnesium alloy, copper and a copper alloy, zinc and a zinc alloy, either individually or in combination of two or more depending on the application. If the metal used as the molten metal is the same metal as the metal particles mixed in advance into the carbon fiber composite material or the formed product of carbon fiber composite, or an alloy containing the same metal element as the metal particles, wettability with the metal particles is increased, whereby the strength of the carbon fiber-metal composite material or the formed product of carbon fiber-metal composite as the product can be increased.

A casting step using a pressureless permeation method in which a molten metal is caused to permeate the formed product of carbon fiber composite according to one embodiment of the present invention is described below in detail with reference to FIGS. 2 and 3.

Figure 2:
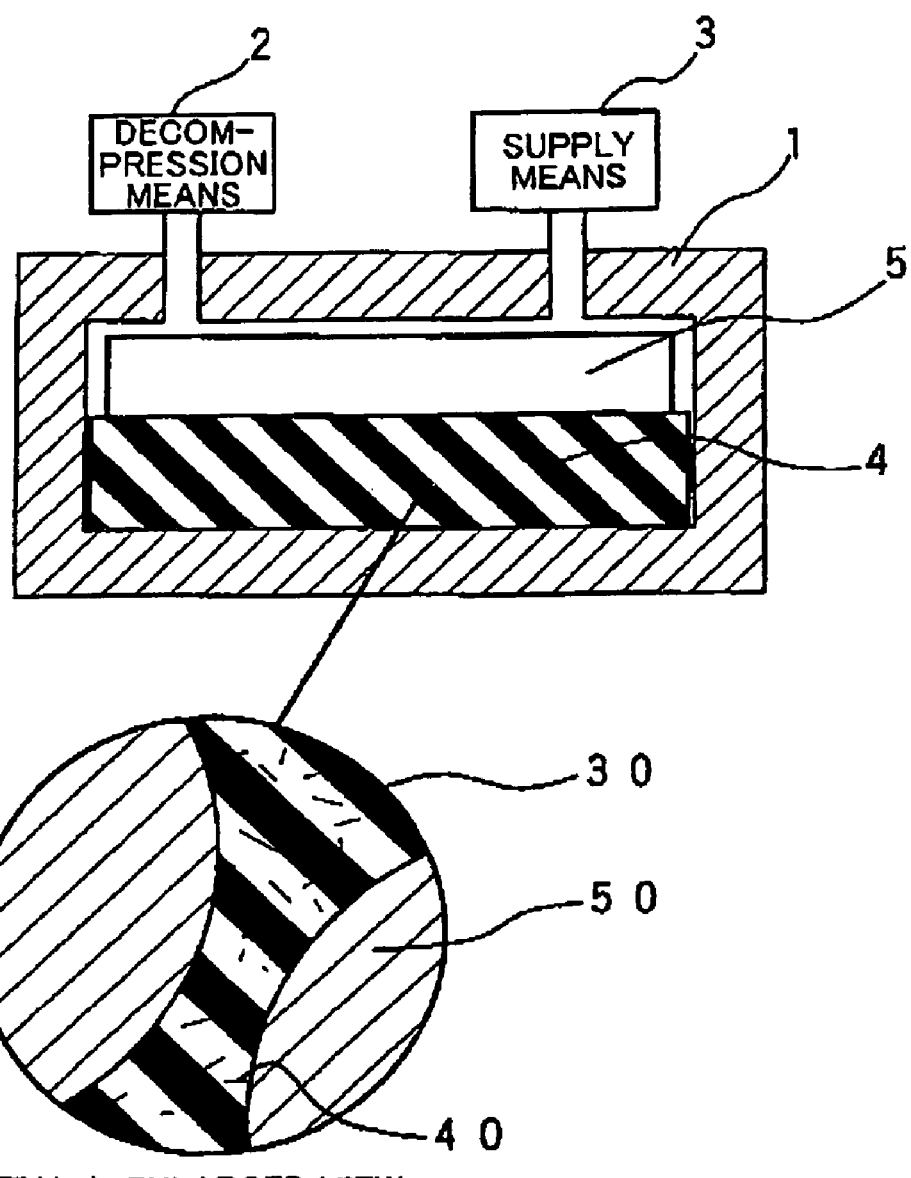
FIG. 2 is a diagram schematically showing a device for producing a formed product of carbon fiber-metal composite by a pressureless permeation method.
Figure 3:
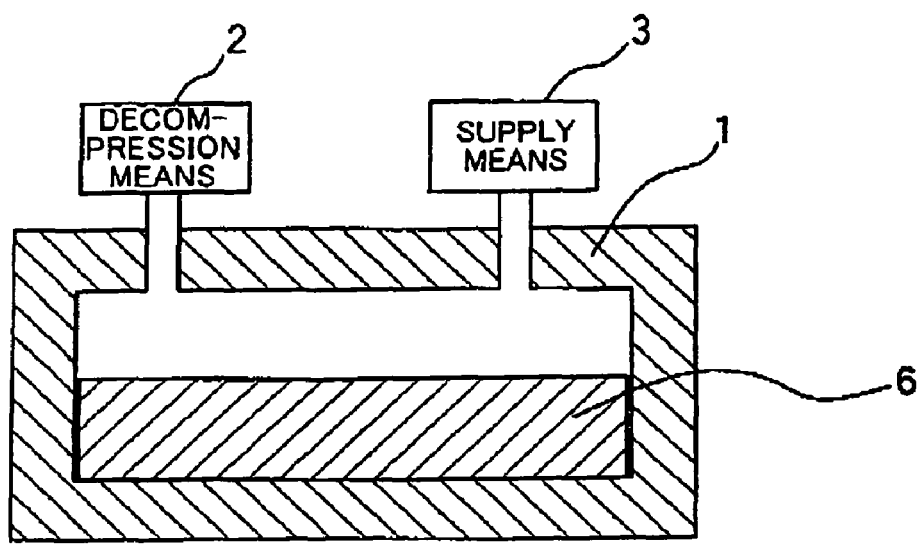
FIG. 3 is a diagram schematically showing another device for producing a formed product of carbon fiber-metal composite by a pressureless permeation method.

FIGS. 2 and 3 are schematic configuration diagrams of a device for producing a formed product of carbon fiber-metal composite by using the pressureless permeation method. As the formed product of carbon fiber composite obtained in the above embodiment, a formed product of carbon fiber composite 4 which is compression-formed in a forming die having the shape of the final product may be used, for example. It is preferable that the formed product of carbon fiber composite 4 be not crosslinked. If the formed product of carbon fiber composite 4 is not crosslinked, the permeation rate of the molten metal is increased. In FIG. 2, the formed product of carbon fiber composite 4 formed in advance (metal particles such as aluminum particles 50 and carbon nanofibers 40 are mixed into uncrosslinked elastomer 30, for example) is placed in a sealed container 1. A metal ingot such as an aluminum ingot 5 is disposed on the formed product of carbon fiber composite 4. The formed product of carbon fiber composite 4 and the aluminum ingot 5 disposed in the container 1 are heated to a temperature equal to or higher than the melting point of aluminum by using a heating means (not shown) provided to the container 1. The heated aluminum ingot 5 melts to become aluminum molten metal (molten metal). The elastomer 30 in the formed product of carbon fiber composite 4 which is in contact with the aluminum molten metal is decomposed and vaporized, and the aluminum molten metal (molten metal) permeates the space formed by decomposition of the elastomer 30.

In the formed product of carbon fiber composite 4, the space formed by decomposition of the elastomer 30 allows the aluminum molten metal to permeate the entire formed product due to a capillary phenomenon. The aluminum molten metal permeates the space between the aluminum particles 50 of which wettability is improved by being reduced due to the capillary phenomenon, whereby the inside of the formed product of carbon fiber composite is entirely filled with the aluminum molten metal. The heating by the heating means of the container 1 is then terminated, and the molten metal which has permeated the mixed material 4 is allowed to cool and solidify to obtain a formed product of carbon fiber-metal composite 6 as shown in FIG. 3 in which the carbon nanofibers 40 are uniformly dispersed. The formed product of carbon fiber composite 4 used in the casting step is preferably formed in advance using metal particles of the same metal as the molten metal used in the casting step. This enables the molten metal and the metal particles to be easily mixed, whereby a homogeneous metal can be obtained.

The atmosphere inside the container 1 may be removed by a decompression means 2 such as a vacuum pump connected with the container 1 before heating the container 1. Nitrogen gas may be introduced into the container 1 from an inert-gas supply means 3 such as a nitrogen gas cylinder connected with the container 1.

In the case of using aluminum as the metal particles and the molten metal, since the surfaces of the aluminum particles 42 and the aluminum ingot 5 are covered with an oxide, wettability between the aluminum particles 42 and the aluminum ingot 5 is poor. However, wettability between the aluminum particles 42 and the aluminum ingot 5 is excellent in this embodiment. The reason therefor is considered to be as follows. Specifically, when the aluminum molten metal is caused to permeate, the molecular end of the thermally decomposed elastomer becomes a radical, and the oxide (alumina) on the surfaces of the aluminum ingot 5 and the aluminum particles 42 is reduced by the radical. Therefore, in this embodiment, since the reducing atmosphere can be generated even inside the formed product of carbon fiber composite by decomposition of the elastomer included in the formed product of carbon fiber composite, the casting process using the pressureless permeation method can be performed without providing a reducing atmosphere processing chamber as in a conventional method. As described above, since wettability between the reduced surfaces of the aluminum particles and the permeated aluminum molten metal is improved, a more homogeneously integrated metal material or metal formed product can be obtained. Moreover, flows due to permeation of the aluminum molten metal cause the carbon nanofibers to enter the aluminum particles. Furthermore, the surfaces of the carbon nanofibers are activated by the radicals of the decomposed elastomer molecules, whereby wettability with the aluminum molten metal is improved. The formed product of carbon fiber-metal composite thus obtained includes the carbon nanofibers uniformly dispersed in the aluminum matrix. The aluminum molten metal is prevented from being oxidized by performing the casting step in an inert atmosphere, whereby wettability with the aluminum particles is further improved.

7. Powder-forming Method

The carbon fiber-metal composite material or the formed product of carbon fiber-metal composite according to one embodiment of the present invention may be obtained by a step of powder-forming the carbon fiber composite material or the formed product of carbon fiber composite obtained by the above-described steps. In more detail, the carbon fiber composite material obtained in the above embodiment is compressed in a die after optionally mixing the carbon fiber composite material with other metal materials, and is sintered at the sintering temperature of the metal particles (550° C. when the metal particles are aluminum particles, for example) to obtain a carbon fiber-metal composite material.

The powder-forming in this embodiment is the same as powder-forming in a metal forming process and includes powder metallurgy. The powder-forming in this embodiment includes not only the case of using a powder raw material, but also the case of using a raw material formed in the shape of a block by compression preforming the carbon fiber composite material. As the sintering method, a generally-used sintering method, a spark plasma sintering method (SPS) using a plasma sintering device, or the like may be employed.

The carbon fiber composite material and particles of other metal materials may be mixed by dry blending, wet blending, or the like. In the case of using wet blending, it is preferable to mix (wet-blend) the carbon fiber composite material with particles of other metal materials in a solvent. Since the carbon fiber composite material or the formed product of carbon fiber composite which is ground in the shape of a particle can be used in wet blending or dry blending, the material is easily utilized for metalworking.

The carbon fiber-metal composite material or the formed product of carbon fiber-metal composite produced by such powder-forming is obtained in a state in which the carbon nanofibers are dispersed in the metal material as the matrix. The particles of other metal materials used in this step may be a material either the same as or different from the material for the metal particles. A carbon fiber-metal composite material having desired properties can be produced by adjusting the ratio of the metal material and other metal particles.

8. EXAMPLES 1 TO 7 AND COMPARATIVE EXAMPLES 1 AND 2

Examples according to the present invention and Comparative Examples are described below. Note that the present invention is not limited to the following examples.

8.1 Preparation of Samples 8.1.1 Uncrosslinked Sample (Carbon Fiber Composite Material)

Step 1: An open roll with a roll diameter of six inches (Toll temperature: 10 to 20° C.) was provided with a predetermined amount (100 g) of a polymer substance (100 parts by weight (phr)) shown in Table 1, and the polymer substance was wound around the roll.

Step 2: Metal particles were added to the polymer substance in an amount (parts by weight) shown in Table 1. The roll distance was set at 1.5 mm. The type of the metal particles added is described later.

Step 3: Carbon nanofibers ("CNT" in Table 1) were added to the polymer substance including the metal particles in an amount (parts by weight) shown in Table 1. The roll distance was set at 1.5 mm.

Step 4: After the addition of the carbon nanofibers, the mixture of the polymer substance and the carbon nanofibers was removed from the rolls.

Step 5: The roll distance was reduced from 1.5 mm to 0.3 mm, and the mac was positioned and tight milled. The surface velocity ratio of the two rolls was set at 1.1. The tight milling was repeated ten times.

Step 6: The rolls were set at a predetermined distance (1.1 mm), and the mixture which had been tight milled was positioned and sheeted.

Uncrosslinked samples of Examples 1 to 5 were obtained in this manner. The steps 2 to 4 were omitted to obtain uncrosslinked samples of Comparative Examples 1 and 2.

8.1.2 Crosslinked Sample (Formed Product of Carbon Fiber Composite)

The steps 1 to 5 were conducted in the same manner as in the case of the uncrosslinked samples.

Step 6: The rolls were set at a predetermined distance 1.1 mm, and the mixture which had been tight milled was positioned. A predetermined amount of a crosslinking agent (2 parts by weight) was added to the mixture. The mixture was then sheeted.

Step 7: The sample cut into a die size was placed in a die and subjected to press-crosslinking at 175° C. and 100 kgf/cm$^2$ for 20 minutes.

Crosslinked samples of Examples 1 to 4 were obtained in this manner. The steps 2 to 4 were omitted to obtain crosslinked samples of Comparative Examples 1 and 2.

8.1.3 Formed Product of Carbon Fiber-metal Composite

The uncrosslinked sample (formed product of carbon fiber composite) obtained in each of Examples 1 to 5 was disposed in a container (furnace). An aluminum ingot (metal) was placed on the uncrosslinked sample, and the sample and the aluminum ingot were heated to the melting point of aluminum in an inert gas (nitrogen) atmosphere. The aluminum ingot melted to become aluminum molten metal. The molten metal permeated the uncrosslinked sample to replace the polymer substance in the uncrosslinked sample. After permeation of the aluminum molten metal was completed, the aluminum molten metal was allowed to cool and solidify to obtain a formed product of carbon fiber-metal composite.

As the metal particles of Examples 1 to 5, aluminum particles (average particle size: 50 μm) were used. As the carbon nanofibers, carbon nanofibers having a diameter (fiber diameter) of 10 to 20 am were used.

In Example 6, a formed product of carbon fiber-metal composite (carbon nanofiber content was 0.4 vol %) was obtained by changing the amount of the carbon nanofibers in Example 5 to 2.5 parts by weight. In Example 7, a formed product of carbon fiber-metal composite (carbon nanofiber content was 0.8 volts) was obtained by changing the amount of the carbon nanofibers in Example 5 to 5 parts by weight. The carbon nanofiber content in the formed product of carbon fiber-metal composite of Example 5 was 1.6 vol %.

8.2 Measurement by Pulsed NMR Technique

The uncrosslinked samples and the crosslinked samples of Examples 1 to 5 were subjected to measurement by the Hahn-echo method using the pulsed NMR technique. The measurement was conducted using "JMN-MU25" manufactured by JEOL, Ltd. The measurement was conducted under conditions of an observing nucleus of $^1$H, a resonance frequency of 25 MHz, and a 90° pulse width of 2 μsec, and a decay curve was determined while changing Pi in a pulse sequence (90° x-Pi-180° x) of the Hahn-echo method. The sample was measured in a state in which the sample was inserted into a sample tube within an appropriate range of a magnetic field. The measurement temperature was 150° C. The first spin-spin relaxation time (T2n), the second spin-spin relaxation time (T2nn), and the fraction (fnn) of components having the second spin-spin relaxation time were determined by the measurement for the raw material elastomer and the uncrosslinked sample and the crosslinked sample of the composite material. The first spin-spin relaxation time (T2n) of the raw material elastomer was determined at a measurement temperature of 30° C. The amount of change (ΔT1) it the spin-lattice relaxation time per part by weight of the carbon nanofibers was determined for the crosslinked sample of the composite material. The measurement results are shown in Table 1. The second spin-spin relaxation time (T2nn) of the uncrosslinked sample of Example 1 was 4,500 (μsec), and the fraction (fnn) of components having the second spin-spin relaxation time was 0.127. The second spin-spin relaxation time (T2nn) of the crosslinked sample of Example 1 was 3,180 (μsec), and the fraction (fnn) of components having the second spin-spin relaxation time was 0.034. The second spin-spin relaxation time (T2nn) of Examples 2 to 5 was not detected. Therefore, the fraction (fnn) of components having the second spin-spin relaxation time was zero.

8.3 E' (Dynamic Viscoelasticity), TB (Tensile Strength), and EB (Elongation at Break)

E', TB, and EB of the crosslinked samples of the composite materials of Examples 1 to 5 were measured in accordance with JIS K 6521-1993. The results are shown in Table 1.

8.4 Flow Temperature

The flow temperature of the raw material elastomer and the uncrosslinked samples of the composite materials of Example 1 to 5 was determined by dynamic viscoelasticity measurement (JIS K 6394). In more detail, the flow temperature was determined by applying sine vibration (±0.1% or less) to the sample having a width of 5 mm, a length of 40 mm, and a thickness of 1 mm, and measuring the stress and phase difference δ generated by applying the sine vibration. The temperature was changed from −70° C. to 150° C. at a temperature rise rate of 2° C./min. The results arc shown in Table 1. In Table 1, a case where a flow phenomenon of the sample was not observed up to 150° C. was indicated as "150° C. or higher".

TABLE 1

|  |  | Example 1 | Example 2 | Example 3 | Example 4 | Example 5 | Comparative Example 1 | Comparative Example 2 |
|---|---|---|---|---|---|---|---|---|
| Raw material elastomer | Polymer substance | EPDM | EPDM | EPDM | EPDM | NR | NR | EPDM |
|  | Polar group | Double bond Norbornene | Double bond Norbornene | Double band Norbornene | Double bond Norbornene | Double bond | Double bond | Double bond Norbornene |
|  | Average molecular weight | 200,000 | 200,000 | 200,000 | 200,000 | 3,000,000 | 3,000,000 | 200,000 |
|  | T2n (30° C.) (μsec) | 520 | 520 | 520 | 520 | 700 | 700 | 520 |
|  | T2n (150° C.) (μsec) | 2,200 | 2,200 | 2,200 | 2,200 | 5,500 | 5,500 | 2,200 |
|  | T2nn (150° C.) (μsec) | 16,000 | 16,000 | 16,000 | 16,000 | 18,000 | 18,000 | 16,000 |
|  | fnn (150° C.) | 0.405 | 0.405 | 0.405 | 0.405 | 0.381 | 0.381 | 0.405 |
|  | Flow temperature (° C.) | 55 | 55 | 55 | 55 | 40 | 40 | 55 |
| Composition | Polymer (phr) | 100 | 100 | 100 | 100 | 100 | 100 | 100 |
|  | Al particles (phr) | 50 | 500 | 1,000 | 500 | 500 | 0 | 0 |
|  | CNT (phr) | 10 | 10 | 10 | 60 | 10 | 0 | 0 |
| Uncrosslinked sample | Flow temperature (° C.) | 95 | 150 or higher | 150 or higher | 150 or higher | 150 or higher | −27.8 | 55 |
|  | T2n (150° C.) (μsec) | 1,450 | 1,400 | 2,000 | 1,050 | 1,640 | 5,450 | 2,200 |
| Crosslinked sample | T2n (150° C.) (μsec) | 540 | 560 | 600 | 580 | 880 | 1,280 | 640 |
|  | E' (30° C.) (MPa) | 8.21 | 64.5 | 129 | 645 | 13.1 | 1.16 | 2.98 |
|  | TB (MPa) | 11.3 | 28.4 | 25.8 | 77.4 | 15.7 | 3.5 | 1.7 |
|  | EB (%) | 120 | 55 | 25 | 15 | 150 | 240 | 180 |
|  | ΔT1 (msec/CNF 1 vol %) | 5.35 | 6.28 | 6.19 | 7.25 | 14.5 | 0 | 0 |
| Carbon fiber-metal composite material (aluminum) | Metal forming state (metallographical microscope) | Good | Good | Good | Good | Good | — | — |
|  | CNT dispersion state (SEM observation) | Good | Good | Good | Good | Good | — | — |

As shown in Table 1, the following items were confirmed according to Examples 1 to 5 of the present invention. Specifically, the spin-spin relaxation times at 150° C. (T2n and T2nn/150° C.) of the uncrosslinked sample (carbon fiber composite material) and the crosslinked sample (formed product of carbon fiber composite) including the metal particles and the carbon nanofibers are shorter than those of the raw material elastomer which does not include the metal particles and the carbon nanofibers. The fraction (fnn/150° C.) of the uncrosslinked sample (carbon fiber composite material) and the crosslinked sample (formed product of carbon fiber composite) including the metal particles and the carbon nanofibers is smaller than that of the raw material elastomer which does not include the metal particles and the carbon nanofibers. The amount of change (ΔT1) in the spin-lattice relaxation time (T1) of the uncrosslinked sample (carbon fiber composite material) and the crosslinked sample (formed product of carbon fiber composite) including the metal particles and the carbon nanofibers is smaller than that of the raw material elastomer which does not include the metal particles and the carbon nanofibers. These results show that the carbon nanofibers are uniformly dispersed in the carbon fiber composite materials according to the examples.

This is more clearly understood by comparing Example 1 with Comparative Example 2. Specifically, in Comparative Example 2 which does not include the carbon nanofibers, the spin-spin relaxation times (T2n and T2nn/150° C.) of the uncrosslinked sample are similar to those of the raw material elastomer. On the other hand, in Example 1 of the present invention, the spin-spin relaxation times (T2n and T2nn/150° C.) of the uncrosslinked sample (carbon fiber composite material) are considerably shorter than those of the raw material elastomer. The same fact was confirmed for the fraction (fnn/150° C.).

It was confirmed that the spin-spin relaxation times (T2n and T2nn/150° C.) of the crosslinked sample (formed product of carbon fiber composite) are shorter than those of the raw material elastomer. The same fact was confirmed for the fraction (fnn/150° C.). The amount of change (ΔT1) in the spin-lattice relaxation time per vol % of the carbon nanofibers was confirmed to be smaller than that of the raw material elastomer.

As is clear from the results for E', TB, and EB using the crosslinked sample, according to Examples 1 to 5 of the present invention, it was confirmed that the presence of the carbon nanofibers improves dynamic viscoelasticity and tensile strength while maintaining elongation at break, whereby the reinforcing effect can be obtained by the carbon nanofibers. This fact is more clearly understood by comparing Examples 1 to 5 with Comparative Examples 1 and 2.

Since the flow temperature of the carbon fiber composite material (uncrosslinked sample) including the metal particles and the carbon nanofibers is 20° C. or more higher than that of the raw material elastomer, it is understood that the carbon fiber composite material has a small temperature dependence of dynamic viscoelasticity and exhibits excellent thermal resistance.

As a result of microscope observation of the carbon fiber-metal composite materials (aluminum matrix) of Examples 1 to 5, a void was observed only to a small extent by observation of the metal forming state using a metallographical microscope ("Good" in Table 1), and aggregation of the carbon nanofibers was observed only to a small extent by observation of the dispersion state of the carbon nanofibers using an electron microscope (SEM) ("Good" in Table 1). In Comparative Examples 1 and 2, microscope observation was omitted since the materials did not include the carbon nanofibers and were not cast ("-" in Table 1).

Figure 4:
FIG. 4 shows a scanning electron microscope (SEM) image of a formed product of carbon fiber-metal composite according to one embodiment of the present invention.

FIG. 4 is an SEM image of the fracture plane of the formed product of carbon fiber-metal composite of Example 2. Thin fibrous sections shown in FIG. 4 are carbon nanofibers in the shape of a curved fiber with a diameter of about 10 to 20 nm. The carbon nanofiber shown in FIG. 4 are thicker than the actual diameter. This shows that the aluminum covers the surfaces of the carbon nanofibers. A number of carbon nanofibers covered with aluminum are dispersed in the aluminum matrix and are entangled only to a small extent. The photographing conditions were set at an acceleration voltage of 7.0 kV and a magnification of 20.0 k.

8.5 Closest Distance

Figure 5:
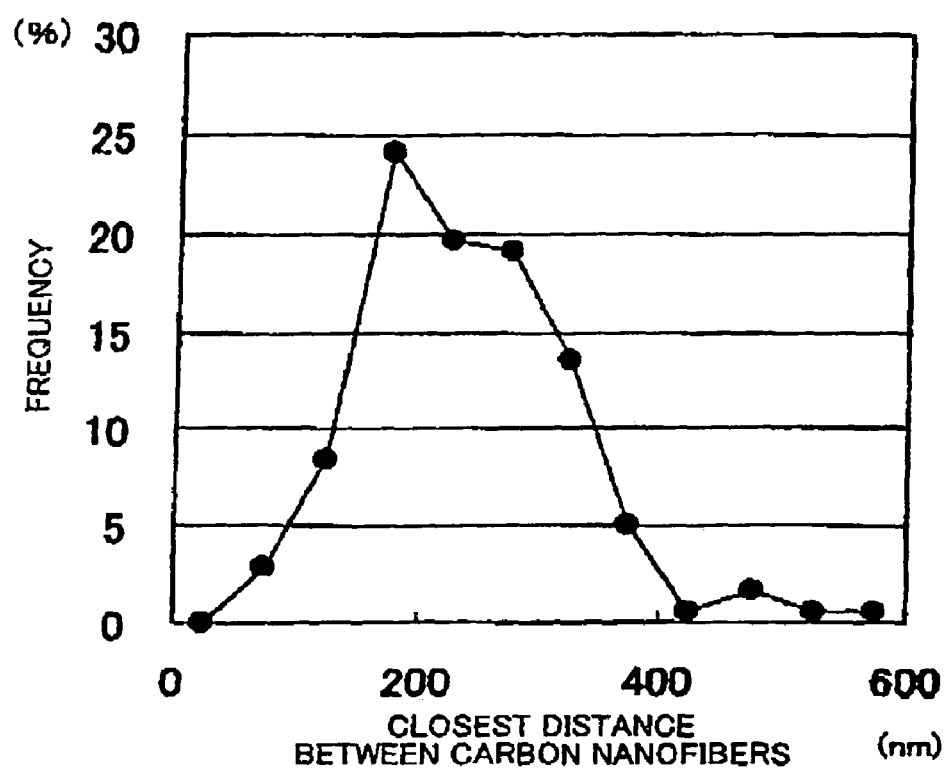
FIG. 5 is a graph showing the distribution of the closest distance between carbon nanofibers in a formed product of carbon fiber-metal composite.
Figure 6:
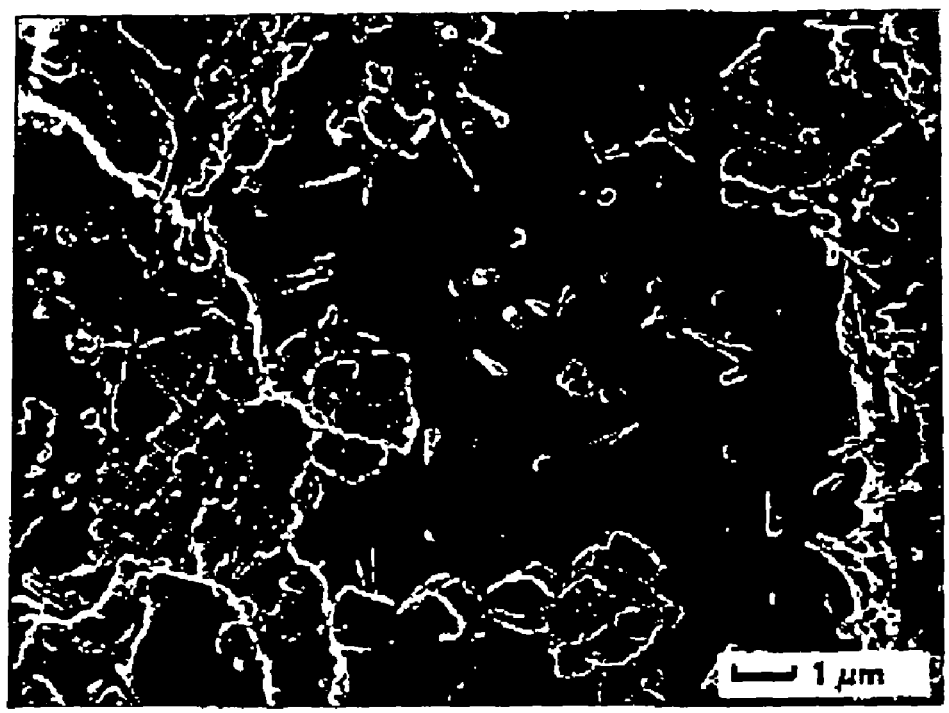
FIG. 6 shows an SEM image of a fracture plane of a formed product of carbon fiber-metal composite according to one embodiment of the present invention.

The closest distance between the carbon nanofibers was measured by observing the fracture plane of the formed product of carbon fiber-metal composite of Example 5 using an electron microscope. As shown in FIG. 6, since the carbon nanofibers are covered with an aluminum compound and present as fibrous substances, the closest distance between the fibrous substances was measured. The measurement results are taken as an evaluation of dispersibility of the carbon nanofibers in the formed product of carbon fiber-metal composite of Example 5, and shown in FIG. 5 as the distribution of the closest distance between the carbon nanofibers. The distribution of the closest distance between the carbon nanofibers showed an almost normal distribution in which the average was 263 nm and the standard deviation was 74.8 mm. Therefore, it was found that the carbon nanofibers were uniformly dispersed in the formed product of carbon fiber-metal composite. In the ease of merely mixing the carbon nanofibers into the aluminum molten metal, it is difficult to measure the closest distance and a normal distribution is not obtained. The aluminum compound covering the carbon nanofibers was a substance which did not melt at 660° C., which is the melting point of the aluminum, and did not fuse even at 1100° C.

8.6 Compressive Stress and Yield Strength

Figure 7:
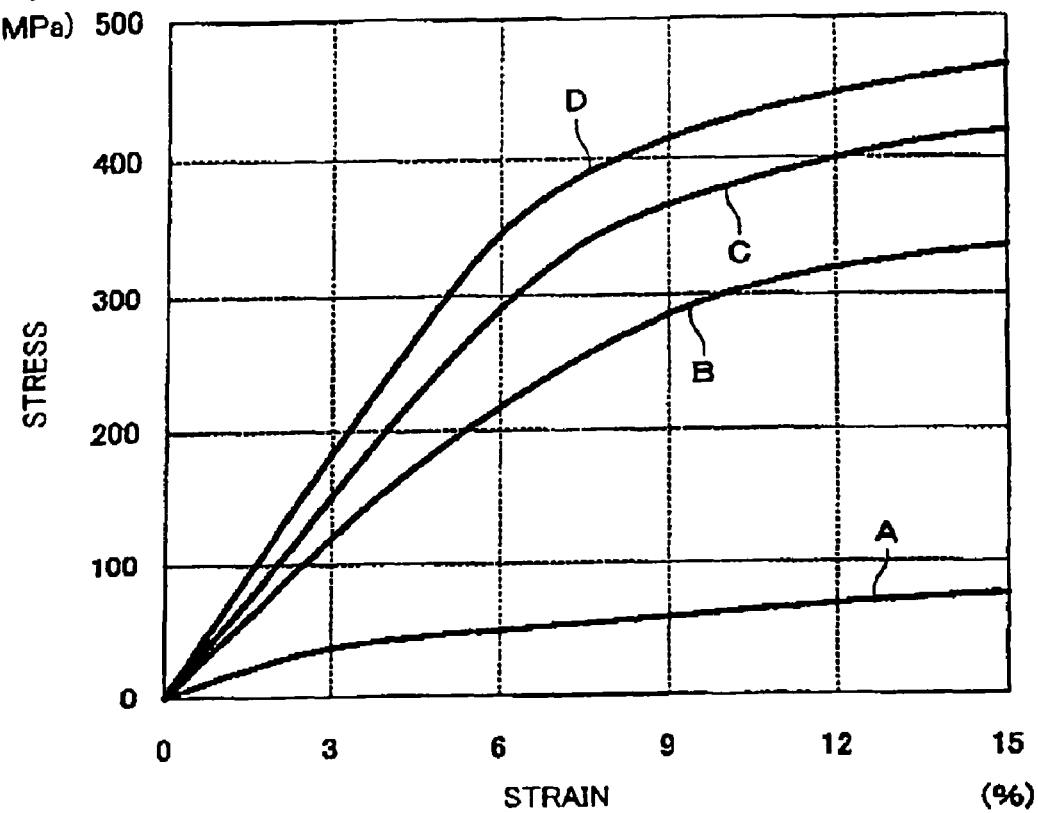
FIG. 7 is a graph showing the relationship between stress and strain of a formed product of carbon fiber-metal composite.
Figure 8:
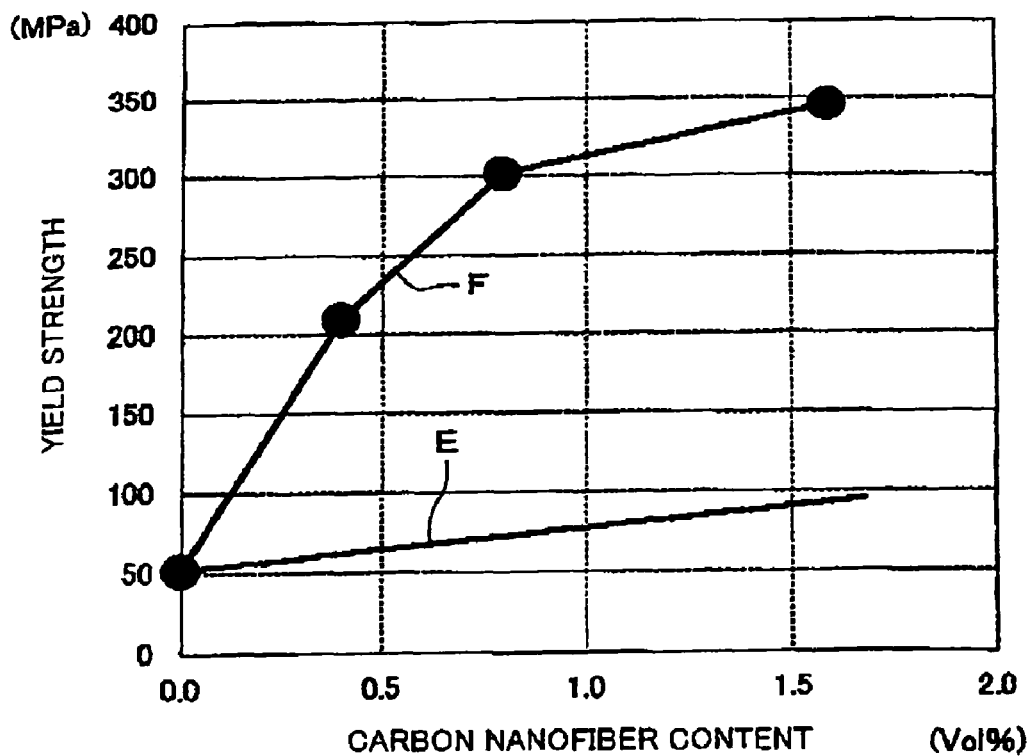
FIG. 8 is a graph showing yield strength of a formed product of carbon fiber-metal composite.

The relationship between compressive stress and strain and yield strength were measured using the formed product of carbon fiber-metal composite samples of Examples 5, 6, and 7. The results are shown in FIGS. 7 and 8. In FIG. 7, a curve A denotes aluminum which does not include the carbon nanofibers, a curve B denotes the formed product of carbon fiber-metal composite of Example 6, a curve C denotes the formed product of carbon fiber-metal composite of Example 7, and a curve D denotes the formed product of carbon fiber-metal composite of Example 5. In FIG. 8, a straight line E denotes aluminum which does not include the carbon nanofibers, and a curve F denotes yield strength of the formed product of carbon fiber-metal composites of Examples 5, 6, and 7. These results show that compressive stress and yield strength of the formed product of carbon fiber-metal composite are improved by adding only a small amount of carbon nanofibers.

8.7 Modulus of Elasticity and Internal Friction

Figure 9:
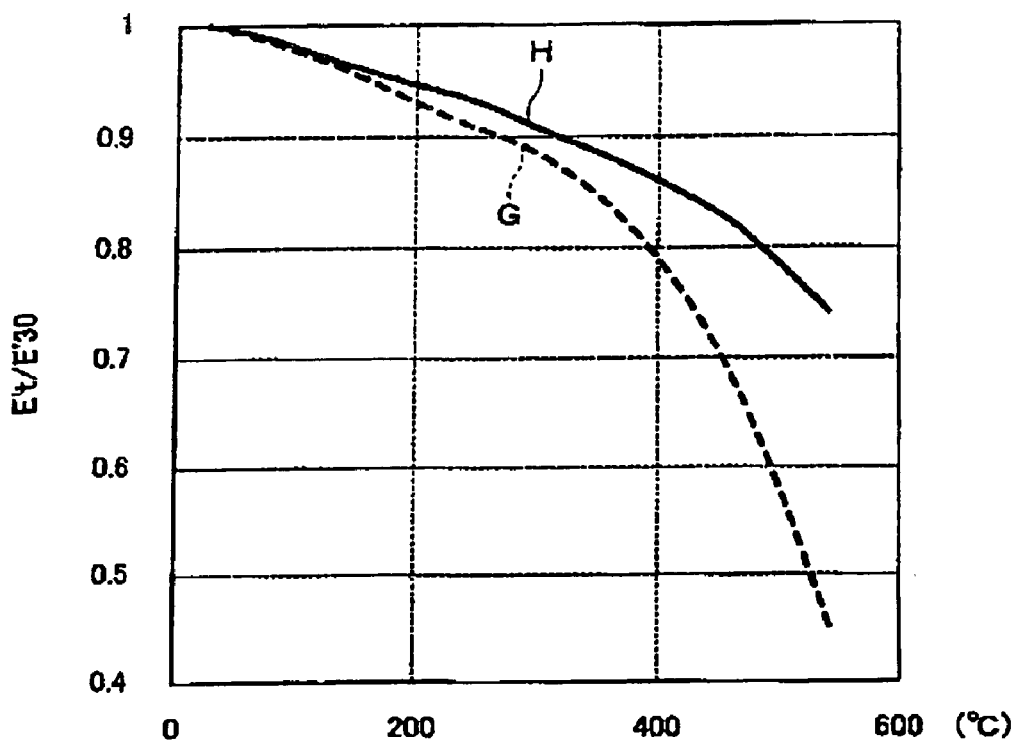
FIG. 9 is a graph showing the relationship between temperature and modulus of elasticity (E't/E'30) of a formed product of carbon fiber-metal composite.
Figure 10:
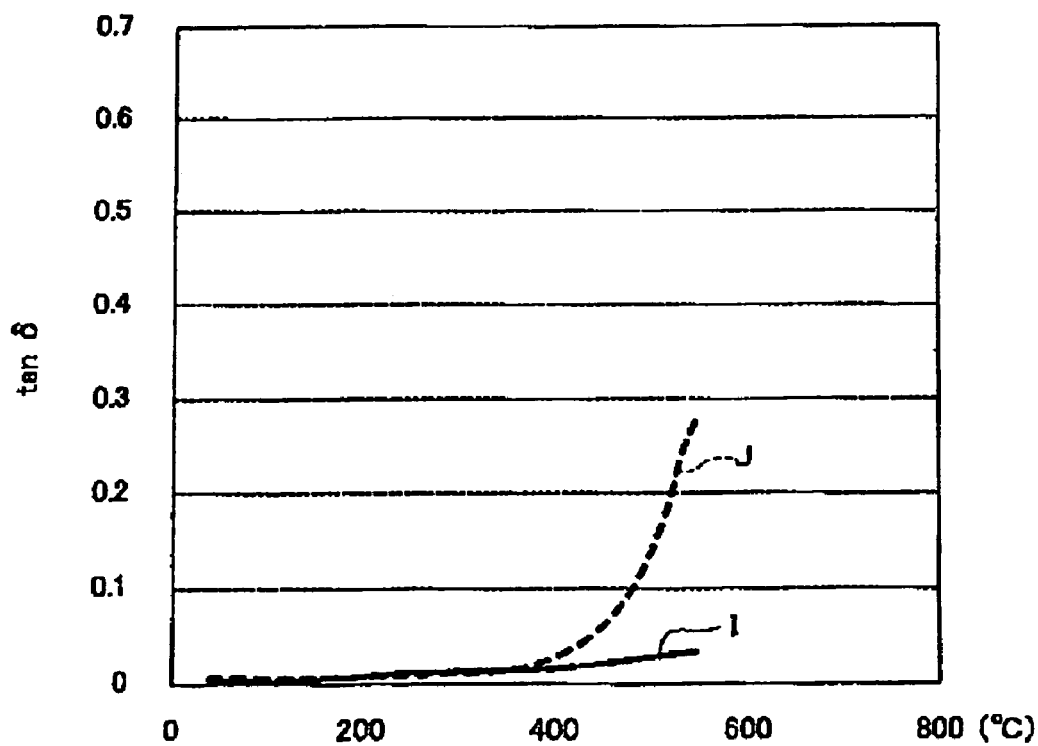
FIG. 10 is a graph showing the relationship between temperature and loss factor (tan δ) of a formed product of carbon fiber-metal composite.
Figure 11:
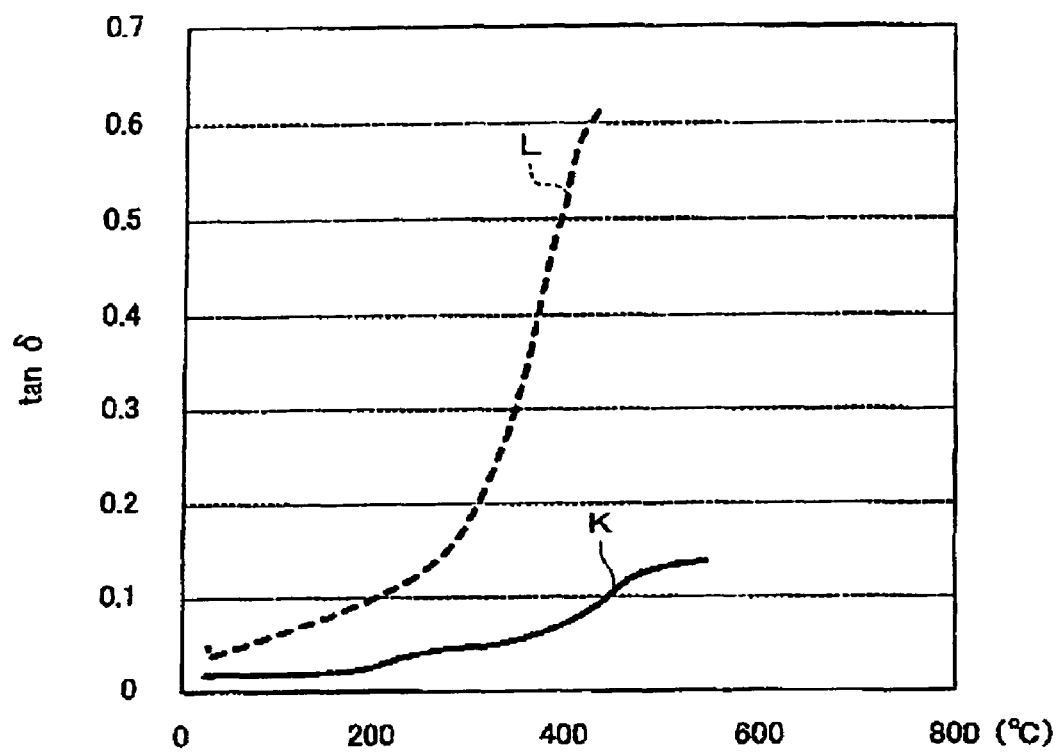
FIG. 11 is another graph showing the relationship between temperature and loss factor (tan δ) of a formed product of carbon fiber-metal composite.

A modulus of elasticity and internal friction were measured by performing a bending test using a dynamics test method (sine vibration non-resonant method). FIG. 9 shows the relationship between the temperature and the modulus of elasticity (E't/E'30). FIGS. 10 and 11 show the relationship between the temperature and the loss factor (tan δ) as internal friction. In FIG. 9, a curve H denotes the formed product of carbon fiber-metal composite of Example 7, and a curve G denotes an aluminum sample which does not include the carbon nanofibers. In FIGS. 10 and 11, curves I and K denote the formed product of carbon fiber-metal composite of Example 7, and curves J and L denote an aluminum sample which does not include the carbon nanofibers. The amount of bending in the bending test shown in FIG. 9 was 10 μm. The amount of bending for the curves I and J in the bending test shown in FIG. 10 was 10 μm, and the amount of bending for the curves K and L in the bending test shown in FIG. 11 was 50 μm. From the results shown in FIGS. 9 to 11, it was found that a decrease in modulus of elasticity and an increase in internal friction due to an increase in temperature were prevented in the formed product of carbon fiber-metal composite in comparison with the aluminum. The chuck interval was 20 mm, the dimensions of the sample were 1 mm in width and 3 mm in thickness the temperature rise rate was 5° C./min, and the vibration frequency was 1 Hz.

As described above, according to the present invention, it was found that the carbon nanofibers, which can be generally dispersed in a substrate to only a small extent, can be uniformly dispersed in the elastomer. In particular, it was found that the carbon nanofibers can be uniformly dispersed in EPDM, which rarely allow the carbon nanofibers to be dispersed therein. Furthermore, it was found that even thin carbon nanofibers with a diameter of 30 nm or less or carbon nanofibers which are easily curved and entangled can be sufficiently dispersed by mixing the metal particles into the elastomer.

What is claimed is:

1. A method of producing a carbon nanofiber composite material, comprising:
   mixing an elastomer which includes an unsaturated bond or a group having affinity to carbon nanofibers with metal particles; and
   mixing the carbon nanofibers into the elastomer including the metal particles and uniformly dispersing the carbon nanofibers by a shear force at 0 to 50° C. by a method selected from the group consisting of an open-roll method with a roll distance of 0.5 mm or less, a closed kneading method, and a multi-screw extruding kneading method,
   wherein the composite material is in an uncrosslinked form and the composite material has a first spin-spin relaxation time (T2n) of 100 to 3,000 μsec, a second spin-spin relaxation time (T2nn) of 1,000 to 10,000 μsec or without the second spin-spin relaxation time, and a fraction (fnn) of components having the second spin-spin relaxation time is less than 0.2, as measured at 150° C. by Hahn-echo method using a pulsed NMR technique with $^1$H as an observing nucleus.

2. The method of producing a carbon nanofiber composite material as defined in claim 1, wherein the metal particles have an average particle diameter greater than an average diameter of the carbon nanofibers, and
   wherein the amount of the metal particles is 10 to 3,000 parts by weight for 100 parts by weight of the elastomer.

3. The method of producing a carbon nanofiber composite material as defined in claim 1, wherein the metal particles have an average particle diameter greater than an average diameter of the carbon nanofibers.

4. The method of producing a carbon nanofiber composite material as defined in claim 1, wherein the metal particles are aluminum particles or aluminum alloy particles.

5. The method of producing a carbon nanofiber composite material as defined in claim 1, wherein at least one of a main chain, a side chain and a terminal chain of the elastomer includes at least one of a double bond, a triple bond, α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group and a urea group.

6. The method of producing a carbon nanofiber composite material as defined in claim 1, wherein a network component of the elastomer in an uncrosslinked form has a spin-spin relaxation time (T2n) measured at 30° C. by a Hahn-echo method using pulsed nuclear magnetic resonance (NMR) technique of 100 to 3,000 μsec.

7. The method of producing a carbon nanofiber composite material as defined in claim 1, wherein a network component of the elastomer in a crosslinked form has a spin-spin relaxation time (T2n) measured at 30° C. by a Hahn-echo method using pulsed nuclear magnetic resonance (NMR) technique of 100 to 2,000 μsec.

8. The method of producing a carbon nanofiber composite material as defined in claim 1, wherein the carbon nanofibers have an average diameter of 0.5 to 500 nm.

9. The method of producing a carbon nanofiber composite material as defined in claim 1, wherein the step of dispersing the carbon nanofibers is conducted by the open-roll method with two rolls having a surface velocity ratio of 1.05 to 3.00.

10. A method of producing a formed product of carbon nanofiber composite, comprising:
obtaining a carbon nanofiber composite material by the method as defined in claim 1 and forming the carbon nanofiber composite material into a desired shape.

11. A method of producing a carbon nanofiber-metal composite material, comprising:
obtaining a formed product of carbon nanofiber composite by the method as defined in claim 10; mixing the formed product of carbon nanofiber composite into a molten metal; and
casting the mixture in a die having a desired shape.

12. The method of producing a carbon nanofiber-metal composite material as defined in claim 11, wherein the molten metal is the same metal as the metal particles.

13. A method of producing a formed product of carbon nanofiber-metal composite, comprising:
obtaining a formed product of carbon nanofiber composite by the method as defined in claim 10; and permeating a molten metal into the formed product of carbon nanofiber composite to replace the elastomer with the molten metal.

14. The method of producing a formed product of carbon nanofiber -metal composite as defined in claim 13, wherein the molten metal is the same metal as the metal particles.

15. A method of producing a formed product of carbon nanofiber-metal composite, comprising:
obtaining a formed product of carbon nanofiber composite by the method as defined in claim 10; disposing a metal ingot above the formed product of carbon nanofiber composite;
heating the metal ingot to melt into a molten metal and heating the formed product of the carbon nanofiber composite to vaporize the elastomer in the formed product of carbon nanofiber composite; and
permeating the molten metal into the formed product of carbon nanofiber composite to replace the elastomer with the molten metal.

16. The method of producing a formed product of carbon nanofiber -metal composite as defined in claim 15, wherein the molten metal is the same metal as the metal particles.

17. A method of producing a carbon nanofiber-metal composite material, comprising:
obtaining a formed product of carbon nanofiber composite by the method as defined in claim 10; and powder-forming the formed product of carbon nanofiber composite.

18. A method of producing a formed product of carbon nanofiber composite, comprising:
obtaining a carbon nanofiber composite material by the method as defined in claim 1; and crosslinking the carbon nanofiber composite material.

19. A method of producing a formed product of carbon nanofiber composite, comprising:
obtaining a carbon nanofiber composite material by the method as defined in claim 1; and crosslinking and forming the carbon nanofiber composite material in a mold having a desired shape.

20. A method of producing a carbon nanofiber-metal composite material, comprising:
obtaining a carbon nanofiber composite material by the method as defined in claim 1; mixing the carbon nanofiber composite material into a molten metal; and
casting the mixture in a die having a desired shape.

21. The method of producing a carbon nanofiber-metal composite material as defined in claim 20, wherein the molten metal is the same metal as the metal particles.

22. A method of producing a carbon nanofiber-metal composite material, comprising:
obtaining a carbon nanofiber composite material by the method as defined in claim 1; and powder-forming the carbon nanofiber composite material.

* * * * *